United States Patent
O'Hara

(10) Patent No.: US 10,798,124 B2
(45) Date of Patent: Oct. 6, 2020

(54) SYSTEM AND METHOD FOR DETECTING SLOWLORIS-TYPE ATTACKS USING SERVER APPLICATION STATISTICS

(71) Applicant: Arbor Networks, Inc., Burlington, MA (US)

(72) Inventor: Sean O'Hara, Ypsilanti, MI (US)

(73) Assignee: Arbor Networks, Inc., Westford, MA (US)

(*) Notice: Subject to any disclaimer, the term of this patent is extended or adjusted under 35 U.S.C. 154(b) by 246 days.

(21) Appl. No.: 15/962,732

(22) Filed: Apr. 25, 2018

(65) Prior Publication Data

US 2019/0334945 A1  Oct. 31, 2019

(51) Int. Cl.
*H04L 29/06* (2006.01)

(52) U.S. Cl.
CPC ...... *H04L 63/1458* (2013.01); *H04L 63/1416* (2013.01); *H04L 63/1408* (2013.01); *H04L 63/1425* (2013.01)

(58) Field of Classification Search
CPC . H04L 63/14; H04L 63/1458; H04L 63/1416; H04L 63/1408; H04L 63/1425
See application file for complete search history.

(56) References Cited

U.S. PATENT DOCUMENTS

| | | | | |
|---|---|---|---|---|
| 9,185,125 B2* | 11/2015 | Varsanyi | ............... | G06F 21/552 |
| 10,027,694 B1* | 7/2018 | Gupta | ................. | H04L 63/1458 |
| 2015/0096020 A1* | 4/2015 | Adams | .................. | H04L 67/303 |
| | | | | 726/23 |
| 2017/0324757 A1* | 11/2017 | Al-Shaer | ............. | H04L 63/1433 |
| 2018/0191744 A1 | 7/2018 | Morales et al. | | |
| 2019/0020680 A1* | 1/2019 | Khalimonenko | ... | H04L 63/1416 |

OTHER PUBLICATIONS mod status—Apache HTTP Server Version 2.4, Apache Module mod status; Copyright 2018 the Apache Software Foundation (accessed Jul. 9, 2018); https://httpd.apache.org/docs/2.4/mod/mod_status.html.

Docs Mod Status—Lighttpd—lighty labs (accessed Jul. 9, 2018) https://redmine.lighttpd.net/projects/lighttpd/wiki/Docs_ModStatus.html.

Module ngx-http-stub-status-module (accessed Jul. 9, 2018) NGiNX http://nginx.org/en/docs/http/ngx_http_stub_status_module_html.

* cited by examiner

*Primary Examiner* — Kristine L Kincaid
*Assistant Examiner* — Shaqueal D Wade
(74) *Attorney, Agent, or Firm* — Locke Lord LLP; Scott D. Wofsy; Christopher J. Capelli

(57) ABSTRACT

A system and computer-implemented method to detect a slowloris-type network attack, wherein the method includes receiving data gathered by a server of a network over time, the data received including data about timing of requests from a plurality of clients received by the server, tracking the data about timing of requests over time, determining one or more characteristics about distribution of the data tracked, tracking the one or more characteristics to determine whether there is an increase in time for reading, by the server, a larger portion of requests tracked, identifying a change in the characteristics that indicates the presence of a slowloris-type network attack, and performing an action, in response to the change, to at least one of generate an alert about the slowloris-type network attack, request mitigation of the slowloris-type network attack, and mitigate the slowloris-type network attack.

20 Claims, 8 Drawing Sheets

SYSTEM AND METHOD FOR DETECTING SLOWLORIS-TYPE ATTACKS USING SERVER APPLICATION STATISTICS

FIELD OF THE INVENTION

The present technology relates to detection of slowloris-type attacks, and more particularly to detection of slowloris-type attacks using server application statistics.

BACKGROUND OF THE INVENTION

Early detection of network attacks can be evasive. Early detection of network attacks is key to avoiding network or server downtime. Failure of a server can cause a loss of data and/or a loss of consumer confidence.

Network monitoring for attacks can be performed by deploying intercept devices, such as taps, port mirrors, and/or probes, and/or adding capabilities to existing network devices, such as routers and/or switches. The intercept devices can intercept packets of network traffic, perform deep packet inspection (DPI), and/or collect flow summaries. However, deployment, configuration, and upkeep of the intercept devices can be cumbersome and consume many human and/or computing resources. Furthermore, in many situations deployment of intercept devices cannot be performed due to inaccessibility to the network to be monitored.

As an example, slowloris network attacks are difficult to detect in early stages. Slowloris is a type of denial of service attack tool in which a single client opens connections to a target web server and sends partial requests. Periodically, the client sends subsequent HTTP headers, adding to, but without completing, the request. Affected servers keep these connections open, allowing their maximum concurrent connection pool to be saturated such that connection attempts from clients are denied. Slowloris affects certain types of servers, whereas similar attacks, referred to herein as slowloris-type attacks, can affect different types of servers.

Such conventional methods and systems have generally been considered satisfactory for their intended purpose. However, there is still a need in the art for a method to detect, alert, and take countermeasures for network attacks against servers without the need to deploy intercept devices or perform deep packet inspection.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a computer-implemented method to detect a slowloris-type network attack. The method includes receiving data gathered by a server of a network over time, the data received including data about timing of requests from a plurality of clients received by the server, tracking the data about timing of requests over time, determining one or more characteristics about distribution of the data tracked, tracking the one or more characteristics to determine whether there is an increase in time for reading, by the server, a larger portion of requests tracked, identifying a change in the characteristics that indicates the presence of a slowloris-type network attack, and performing an action, in response to the change, to at least one of generate an alert about the slowloris-type network attack, request mitigation of the slowloris-type network attack, and mitigate the slowloris-type network attack.

In accordance with embodiments, tracking the data about timing of the requests includes identifying events in the received data that are requests to the server, and determining for each request an amount of time since the beginning of a most recent request.

In accordance with further embodiments, determining the one or more characteristics about distribution of the data tracked includes generating a normal distribution of the data about timing of requests and determining the mean and standard deviation of the normal distribution.

In addition, in accordance with embodiments, tracking the one or more characteristics includes continuously updating the normal distribution as the received data is received over time, continuously updating the mean and standard deviation of the normal distribution over time, identifying when the mean of the normal distribution grows larger over time, and identifying when the standard deviation of the normal distribution grows smaller over time.

In accordance with embodiments, identifying the change in the characteristics that indicates the presence of a slowloris-type network attack includes determining that both the mean of the normal distribution grows larger over time and the standard deviation of the normal distribution grows smaller over time.

Furthermore, in accordance with embodiments, performing the action includes mitigating the slowloris-type network attack.

In accordance with further embodiments, receiving the data further includes receiving data from data sources included in the network that operate on data of the network independent of data inspection performance.

In accordance with embodiments, tracking the data about timing of requests, determining the one or more characteristics about distribution, tracking the one or more characteristics, and identifying the change in the characteristics are performed per client submitting requests of the requests received by the server.

In addition, in accordance with embodiments, performing the action includes blacklisting a client identified as having submitted requests associated with a distribution for which the change in the characteristic was identified.

Furthermore, in accordance with embodiments, the network includes a plurality of servers, and the method further includes receiving data gathered by the plurality of servers of the network over time, the data received including data about timing of requests from a plurality of clients received by each of the servers, tracking, for each of the servers, the data about timing of requests over time, determining, for each of the servers, one or more characteristics about distribution of the data tracked, tracking, for each of the servers, the one or more characteristics to determine whether there is an increase in time for reading, by the server, a larger portion of requests tracked, identifying, for each of the servers, a change in the characteristics that indicates the presence of a slowloris-type network attack targeting the server, and performing an action, in response to the change, to at least one of generate an alert associated with each targeted server about the slowloris-type network attack, request mitigation of the slowloris-type network attack for the targeted server, and mitigate the slowloris-type network attack for the targeted server.

In accordance with another aspect of the disclosure, a system is provided to detect a slowloris-type network attack. The system includes a memory configured to store instructions and a processor disposed in communication with the memory. The processor upon execution of the instructions is configured to perform the operations of the method described.

In accordance with still another aspect of the disclosure, a non-transitory computer readable storage medium and one or more computer programs embedded therein are provided. The computer programs include instructions, which when executed by a computer system, cause the computer system to perform the operations of the method.

In accordance with still another aspect of the disclosure, a computer-implemented method to detect network attacks is provided. The method includes receiving data gathered by one or more servers of a network over time, the data received including data about network traffic exchanged with the one or more servers, tracking the data about the network traffic over time, determining one or more characteristics about distribution of the data tracked, tracking the one or more characteristics, determining whether a change in the characteristics indicates a network attack, and performing an action to at least one of generate an alert about the network attack, request mitigation of the network attack, and mitigate the network attack.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
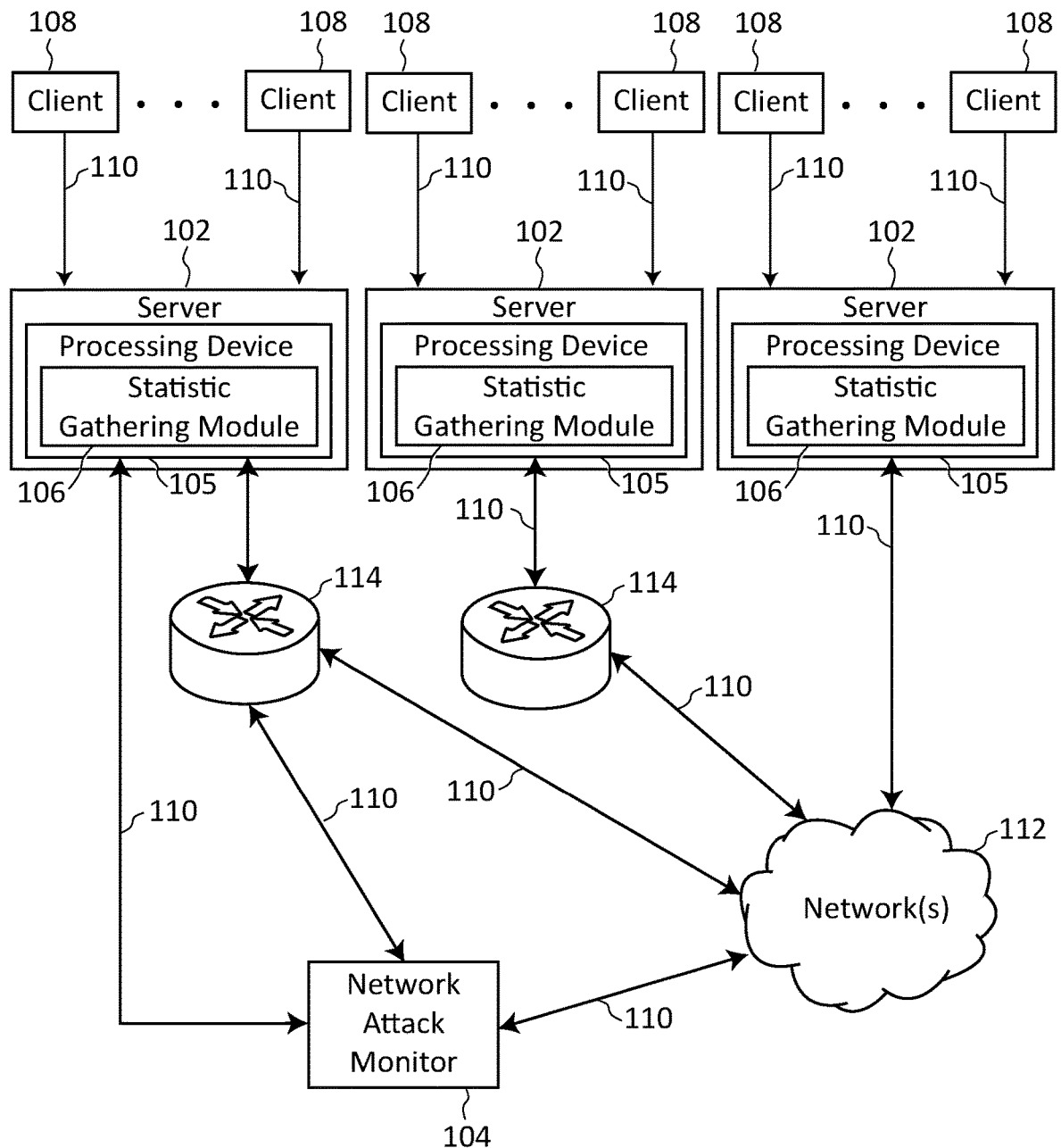
FIG. 1 illustrates a block diagram of an example network system, in accordance with an illustrative embodiment of the present disclosure.

Reference will now be made to the drawings wherein like reference numerals identify similar structural features or aspects of the subject disclosure. For purposes of explanation and illustration, and not limitation, a block diagram of an exemplary embodiment of a network system having a network attack monitor 104 in accordance with the disclosure is shown in FIG. 1 and is designated generally by reference character 100. Other embodiments of the network attack monitor 140 in accordance with the disclosure, or aspects thereof, are provided in FIGS. 2-8, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, network system 100 includes one or more network servers 102 that are monitored by a network attack monitor 104. A plurality of clients 108 communicate with the servers 102. Each client 108 can communicate with one or more of the servers 102. Each server 102 includes a processing device 105 that includes a statistic gathering module 106. The statistics gathering module gathers statistics about operation of the server 102. The network attack monitor 104 receives, via communication links 110, statistics data generated by the statistic gathering modules 106 of the various servers 102. The communication between the statistic gathering module 106 and the network attack monitor 104 can be direct, such as via wired or wireless communication, or indirect, such as via one or more networks 112. The servers 102 (and their respective processing devices 105) can communicate with the network 112 via one or more routers 114.

The clients 108 can be processing devices, such as end user devices, sensors, appliances, microprocessors, servers, etc., that communicate with the servers 102 via communication links 110 in a client/server relationship. These communication links 110 can be wireless links, wired communication links, or a combination thereof. Additionally, the communication links 110 can traverse one or more networks, such as network 112. An end user device is a source or destination of a communication sent via network(s) 112 that interfaces between a user and a network, such as network 112. Examples of user end devices 102a include mobile computing devices (e.g., smart phones, tablets, or laptop computers), desk top computers, computer terminals, web-connected machines or consumer devices, web-connected sensors, point-of-sale (POS) terminals, machines on manufacturing assembly lines, etc.

The servers 102 can be, for example, web servers, application servers, communication servers, banking servers, securities trading servers, etc. Slowloris attacks target servers that use a protocol that allows for large client messages capable of accommodating HTTP headers that are added to client messages during subsequent transmissions. A webserver is a computer system that processes requests via Hypertext Transfer Protocol (HTTP), to serve the files that form Web pages to users, in response to their requests, such as for web browsing or providing single page applications (SPAs). An application server can provide a service to end devices 102. Examples of application servers include media servers for providing a media service (e.g., streaming video or audio); voice over internet servers for providing voice over internet services; data analysis servers for collecting and analyzing data from e.g., sensors; configuration servers for (re-)configuring an end device; and transaction servers for processing a transaction. Examples of such transactions include, for example and without limitation, retail purchases, banking transactions, and securities transactions. A communication server can be an open, standards-based computing system that operates as a carrier-grade common platform for a wide range of communications applications, such as to transfer files or access information on systems or networks at remote locations over telecommunication links. Banking servers and securities trading servers can be servers that specialize in particular types of secure transactions and user services. Some example servers include Apache®, Lighttpd, and NGINX® web servers, all of which are open source web servers. The disclosure is not limited to open source web servers, but can encompass other servers, such as privately owned or closed licensed servers.

Statistic gathering module 106 includes one or more modules that are included with the server 102, such as to track statistics about received requests. The statistic gathering module 106 can be a standard module provided with software executed by the server 102. For example a web server such as Apache® includes a module mod_status that gathers statistics about server load and performance. These statistics can be obtained using deep packet inspection (DPI). The statistics can be general for all network traffic exchanged by the corresponding server 102, can be specific to clients or groups of clients exchanging network traffic with the server 102, and/or can be specific to a direction of the network traffic. Of note is that the DPI is performed by the statistic gathering module 106 of the server 102, as opposed to intercept devices disposed in the network system 100 or other network devices of the network system 100.

The statistics gathering module 106 can obtain data from additional data sources, such as standard modules that perform IP accounting (e.g., systemd) or present system information about file system processes associated with an operating system, such as information about processes in a file-like structure (for example procfs). For example, the statistics can track processes that are running, such as using the ps or top commands in a server 102 executing a LINUX® operating system. The statistics gathering module 106 can communicate the statistics to an outside party, such as network attack monitor 104.

Network attack monitor 104 is a processing device that can have a user interface and/or attack mitigation capabilities. For example, the network attack monitor can be an end user device or a local or cloud-based network and/or attack mitigation system. In embodiments the network attack monitor 104 is a computing device running SP, APS, or TMS software, available from Arbor Inc. of Burlington, Mass. In embodiments, the network attack monitor 104 is a user end device, such as a smart phone, executing an application, e.g., a user-defined plugin, to communicate with the statistic gathering module 106 and perform the functions described in the disclosure.

Each network 112 can be, without limitation, a private or public network that uses wired and/or wireless communication links. The public network can include, for example, a network such as the Internet, a different public network, a cellular network, a public switched telephone network (PSTN), etc. The private network can include, for example, a personal communication service (PCS) network, a LAN, a WAN, a VLAN, etc.

Each of servers 102, network attack monitor 104, and clients 108 may be a special purpose computing device or a software component (not limited to a single process) dedicated to its corresponding functions related to monitoring data communicated via the network(s) 112. For example, servers 102, network attack monitor 104, and clients 108 can execute object oriented programs that define classes, which are non-modifiable once defined, thus forming a virtual machine. Objects are executed as instances of a class. The objects can be interactive objects that include attributes with quantifiable values and functions that are invoked by values. The values can be received as input or from other objects. Alternatively, each of servers 102, network attack monitor 104, and clients 108 may be a general purpose computing device with specialized software components installed thereon.

Figure 2:
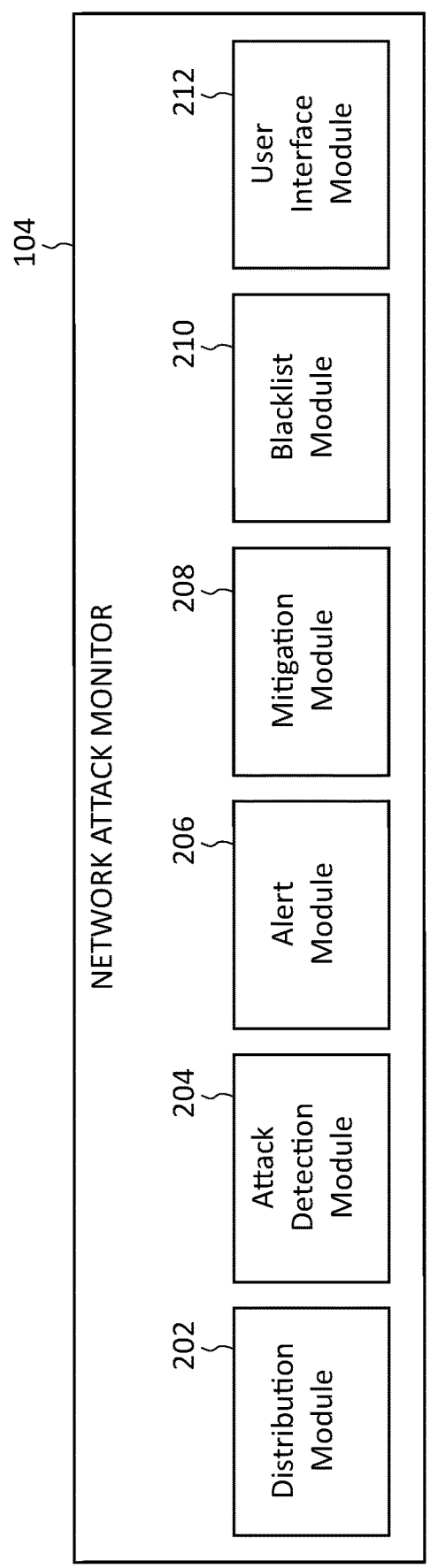
FIG. 2 illustrates block diagram of an example network attack monitor of a network system, in accordance with an illustrative embodiment of the present disclosure.

FIG. 2 shows a block diagram of an example network monitor system 200 that includes a distribution module 202, an attack detection module 204, an alert module 206, and a mitigation module 208, a blacklist module 210, and a user interface module 212.

The distribution module 202 receives the statistics data from statistics gathering modules 106 of one or more severs 102. The statistics data can include information for each communication attempt that begins with a request from a client 108 to the corresponding server 102, including the mode of request (M), seconds since beginning the most recent request (SS), and client identification (IP address (v4 or v6)). Using these statistics data, the distribution module 202 calculates for a predetermined time interval, a number of seconds spent reading (SSR) in response to the respective requests. The SSR equals the total SS currently being processed for read requests, wherein a read request is indicated by M=R. SSR can be calculated for respective clients and/or for all requests. The distribution module 202 uses a windowing function to calculate min, max, and average SSR values for the predetermined time interval. Min, max, and average can be determined for all servers 102 as a total and/or for individual servers 102 for the predetermined time interval. Additionally or alternatively, min, max, and average can be determined per client communicating with one or more specific servers 102 or for all servers 102.

The amount of statistics data received and analyzed by the distribution module 202 can grow into a large dataset over the course of the predetermined time interval. Once sufficient data has been accumulated, the distribution module 202 calculates a normal distribution as a streaming window function, also referred to as a streaming normal distribution.

In embodiments, the predetermined time interval is used to indicate that sufficient data has been accumulated. Examples of default time intervals could range from a single day to a week. Using such a default time interval, the data accumulated would be whatever data was accumulated during the interval.

In embodiments, a the distribution module 202 is configured with a predetermined time interval, a number of histograms NH that sets the number of histograms to be calculated, and a threshold error rate. to calculate histograms for the mean and standard deviation for an error rate. In an example, default values set the predetermined interval equal to 1 day, NH=24, and the threshold error rate equal to 90%. Using these defaults, sufficient data accumulation would be indicated once 24 (NH) consecutive (1-hour) histograms for 1 day (the predetermined time interval) had an error rate below 90% (the threshold error rate).

The mean ($\mu$) and standard deviation ($\sigma$) are determined for the streaming normal distribution, such as at regular time intervals. The distribution module can determine the streaming normal distribution, $\mu$, and $\sigma$ for all servers 102 as a total, for individual servers 102, per client communicating with one or more specific servers 102, and/or per client for all servers 102.

The attack detection module 204 tracks $\mu$ and $\sigma$ and determines whether changes of the tracked $\mu$ and $\sigma$ meet a predetermined condition that indicates the presence of a slowloris-type attack. The predetermined condition can be that an amount by which $\mu$ shifts larger exceeds a first predetermined threshold, and an amount by which $\sigma$ shifts smaller exceeds a second predetermined threshold. When the tracked $\mu$ and $\sigma$ meet the predetermined condition, it indicates that a large enough percentage of the requests received by a server 102 are being read for a large enough amount of time, as would be consistent with behavior during a slowloris attack. The attack detection module 204 can track $\mu$ and $\sigma$ and detect the presence of an attack, such as the slowloris-type attack, for all servers 102 as a total, for individual servers 102, per client communicating with one or more specific servers 102, and/or per client for all servers 102.

Upon determining that the tracked $\mu$ and $\sigma$ meet the predetermined condition, the attack detection module 204 notifies the alert module 206, the mitigation module 208, and/or the blacklist module 210 that the presence of an attack has been detected. The notification can identify the particular attack, which in the present example is the slowloris-type attack. The notification can also identify any specific servers 102 or clients 108 for which the presence of the attack was detected.

Upon notification from the attack detection module 204 that the presence of an attack has been detected, the alert module 206 sends an alert to the server(s) 102 affected by the attack or to a device (e.g., a mobile or stationary device) operated by an administrator of the affected server(s) 102. The alert can also be indicated to a user of the network attack monitor 104, e.g., via a graphical user interface (GUI) provided by a user interface of the network attack monitor 104. The alert indicates that the presence of an attack has been detected, and can further identify the attack. The alert can include, for example, a push notification, an electronically mailed message such as using simple mail transfer protocol (SMTP), a text message such as provided by a multimedia messaging service (MMS) or short message service (SMS), a graphically displayed alert, an audio alert, a vibratory alert, etc. The alert can be sent to the server(s) 102 via a direct connection or a private network (e.g., a LAN, WAN, or VLAN), or via a public network (e.g., the Internet and/or a cellular network).

Upon notification from the attack detection module 204 that the presence of an attack has been detected, the mitigation module 208 performs a mitigation action or requests a mitigation action. The mitigation action can be applied, for example, to network traffic to all servers 102, from an identified client 108, or to an identified server 102. Examples of mitigation actions include identifying the traffic to be mitigated versus legitimate traffic, blocking the identified traffic, applying traffic filters that drop traffic with specific characteristics, forwarding the legitimate traffic. Blocked attack traffic is not transmitted as network traffic to its intended destination, whereas forwarded legitimate traffic is transmitted as network traffic to its intended destination.

Upon notification from the attack detection module 204 that the presence of an attack has been detected that identifies one or more clients 108, the blacklist module 210 adds or requests addition of a blacklist entry of the IP address of the one or more identified clients 108 to a blacklist. The blacklist can be applied by a router or other network device that can filter or block network traffic. When an IP address is blacklisted, future traffic from the same IP address will be blocked.

The user interface module 212 can receive user input data by interfacing with user input devices, such as a keyboard, pointing device (e.g., mouse), touch screen, etc. Additionally, the user interface module 216 interfaces with user output devices, such as a display monitor, audio speakers, vibration devices, and/or a printer, for outputting visualizations of data (e.g., the received statistics data and/or the normal distribution) and alarms to a user. Thus, the user interface module 212 provides an interface for exchanging data between a user and the network attack monitor 104.

Figure 3:
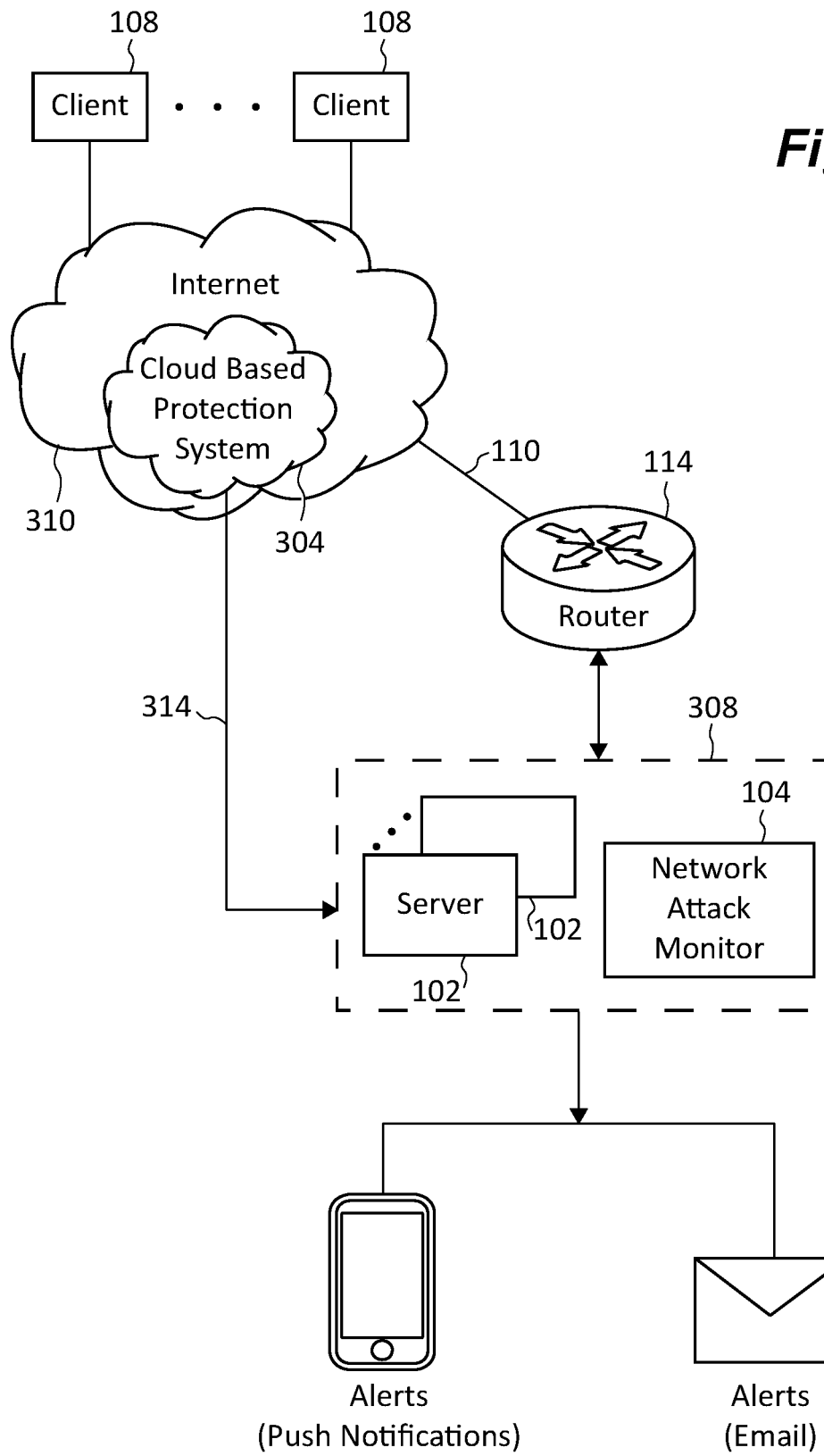
FIG. 3 illustrates a block diagram of an example network system that uses a cloud based protection system, in accordance with an illustrative embodiment of the present disclosure.

FIG. 3 shows an embodiment in which the functionality of the network attack monitor 104 can be shared with a cloud-based protection system 304. Integration between the network attack monitor 104 and the cloud-based protection system 304 can be seamless for detecting attacks, such as slowloris-type attacks, issuing alerts, and optionally implementing countermeasures, such as mitigation and/or blacklisting. The network attack monitor 104 is provided local to one or more servers 102, meaning the network attack monitor 104 is included within the same premises network 308 as the servers 102. The premises network 308 communicates with the Internet 310 via router(s) 114 and communication links 110, which facilitates communication between clients 108 and servers 102. The network attack monitor 104 communicates with the cloud-based protection system 304 via communication links 314. In embodiments, the communication between the network attack monitor 104 and the cloud-based protection system 304 via communication links 314 uses Cloud Signaling by Arbor Networks Inc., of Burlington, Mass., as described in U.S. Pat. No. 9,432,385, assigned to Arbor Networks Inc., which is incorporated by reference herein in its entirely. The network attack monitor 104 can detect an attack, such as a slowloris-type attack, as described in connection with network attack monitor 104.

When an attack is detected, the network attack monitor 104 can notify the cloud-based protection system 304 to perform all or a portion of the functions performed by the alert module 206, the mitigation module 208, and/or the blacklist module 210. In embodiments, the cloud-based protection system 304 can perform all or a portion of the functions performed by the distribution module 202 and/or the attack detection module 204.

For example, when the statistics dataset received by the distribution module 202 or the scale of a detected attack exceeds a relevant threshold measurement, the cloud-based protection system 304 can take-over or share with the functions performed by any of modules 202-212. When the relevant threshold measurement is exceeded, the network attack monitor 104 can submit a request for cloud-based help by the cloud-based protection system 304, which will enlist upstream help. The cloud-based system protection system 304 can apply countermeasures on a larger scale than may be possible for the network attack monitor 104. Accordingly, the amount of traffic filtering or blacklisting that needs to be performed by the network attack monitor 104 may be within the scope of the network attack monitor 104, e.g., until the slack ends or slows down, after which help can be requested again, such as if another attack is launched or a different target is targeted.

An example of requesting help by a premises-based protection system from a cloud-based protection system is described in U.S. patent application Ser. No. 15/399,368, filed Jan. 5, 2017, entitled A SYSTEM AND METHOD TO IMPLEMENT CLOUD-BASED THREAT MITIGATION FOR IDENTIFIED TARGETS, assigned to Arbor Networks Inc., which is incorporated herein by reference.

Figure 4:
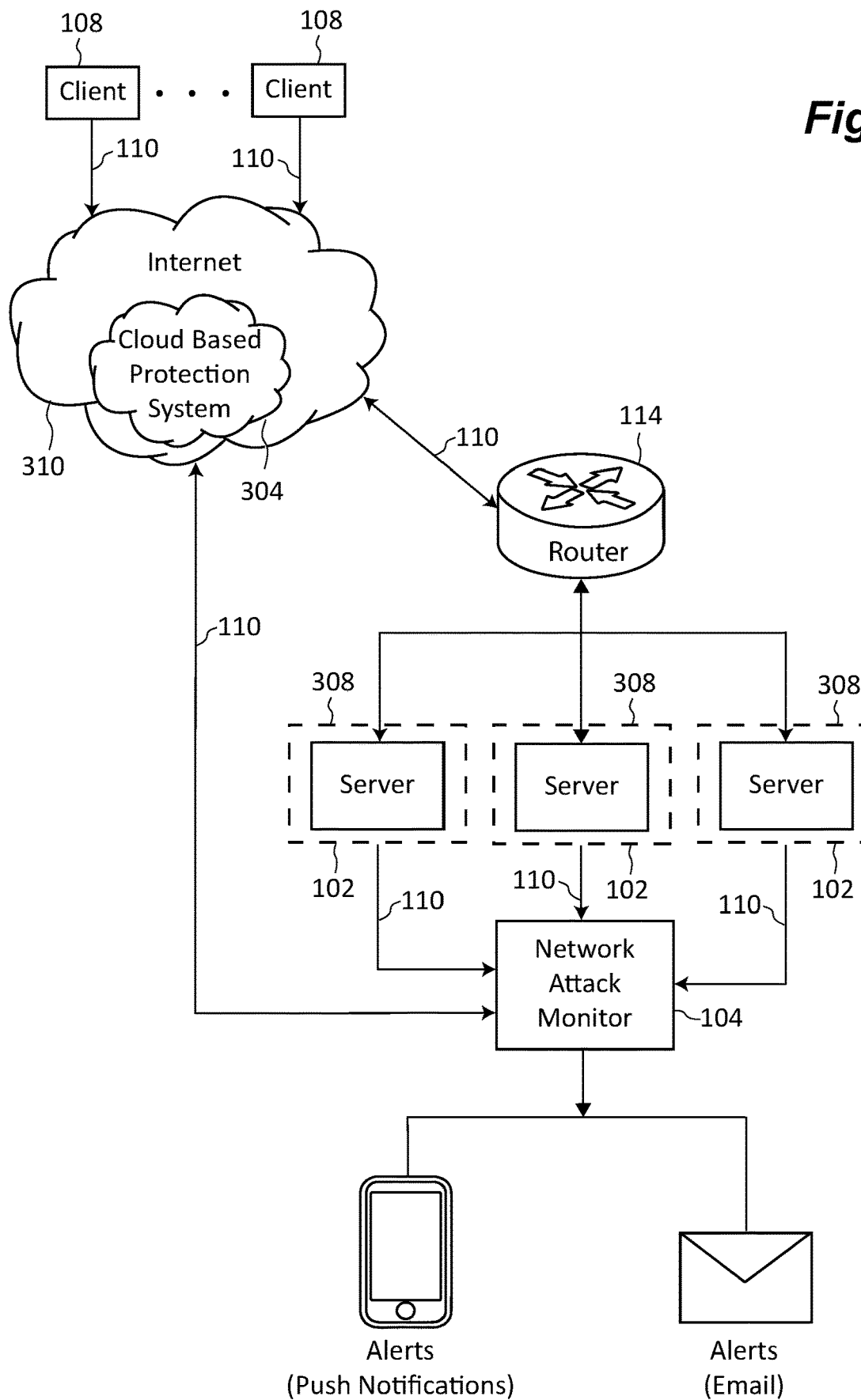
FIG. 4 illustrates a block diagram of another example network system that uses a cloud based protection system, in accordance with an illustrative embodiment of the present disclosure.

FIG. 4 shows a similar example to the example shown in FIG. 3, wherein the network attack monitor 104 monitors several remote servers 102, each of which may be operating within its own premises network 308. The network attack monitor 104 can communicate with the servers 102 via communication links 110, which may traverse a network, such as the Internet. The network attack monitor 104 and cloud-based protection system 304 can share functionality as described with respect to FIG. 3.

Figure 5:
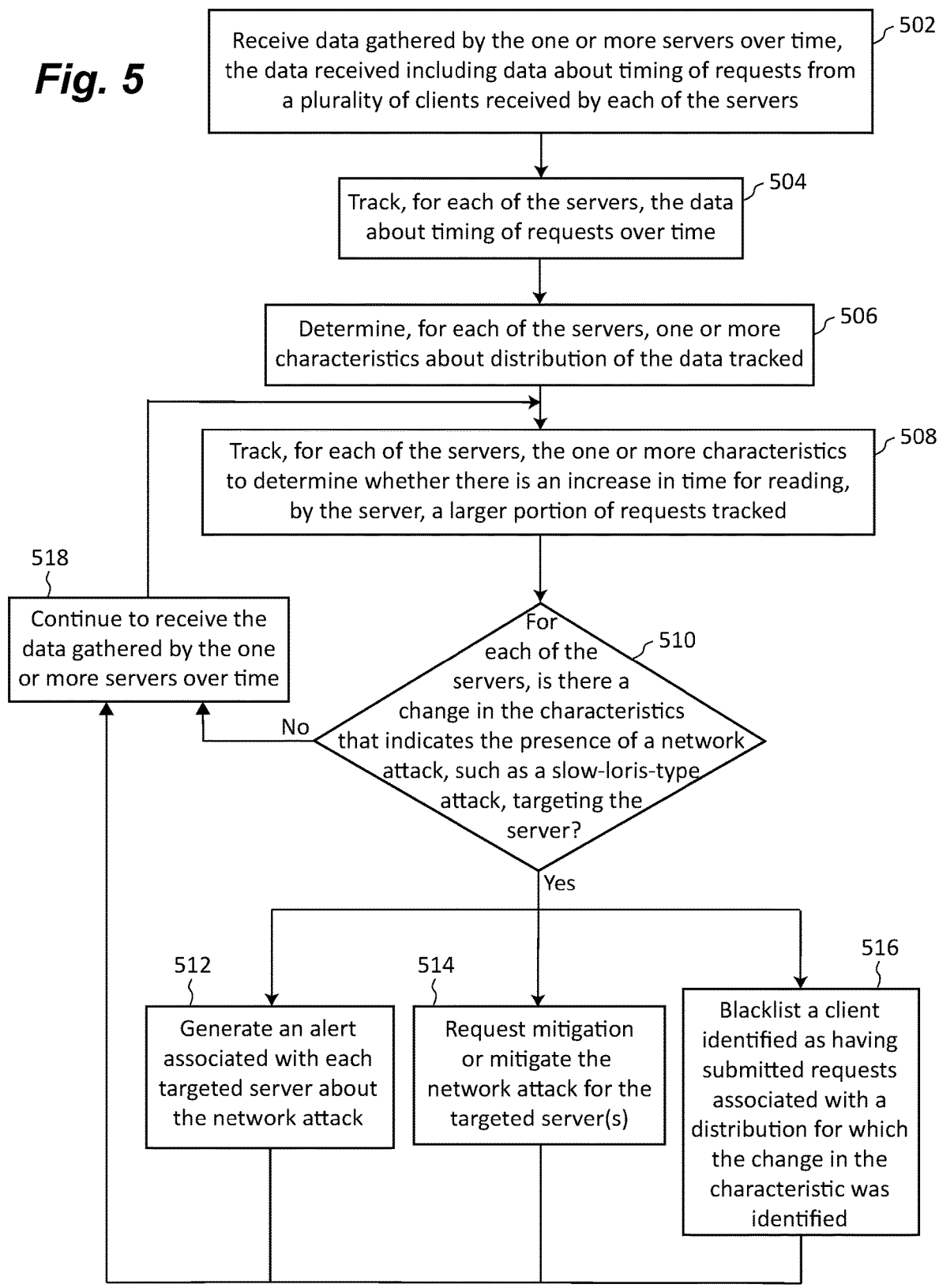
FIGS. 5-7 illustrate flowcharts showing example methods performed by the network attack monitor in accordance with embodiments of the disclosure.
Figure 6:
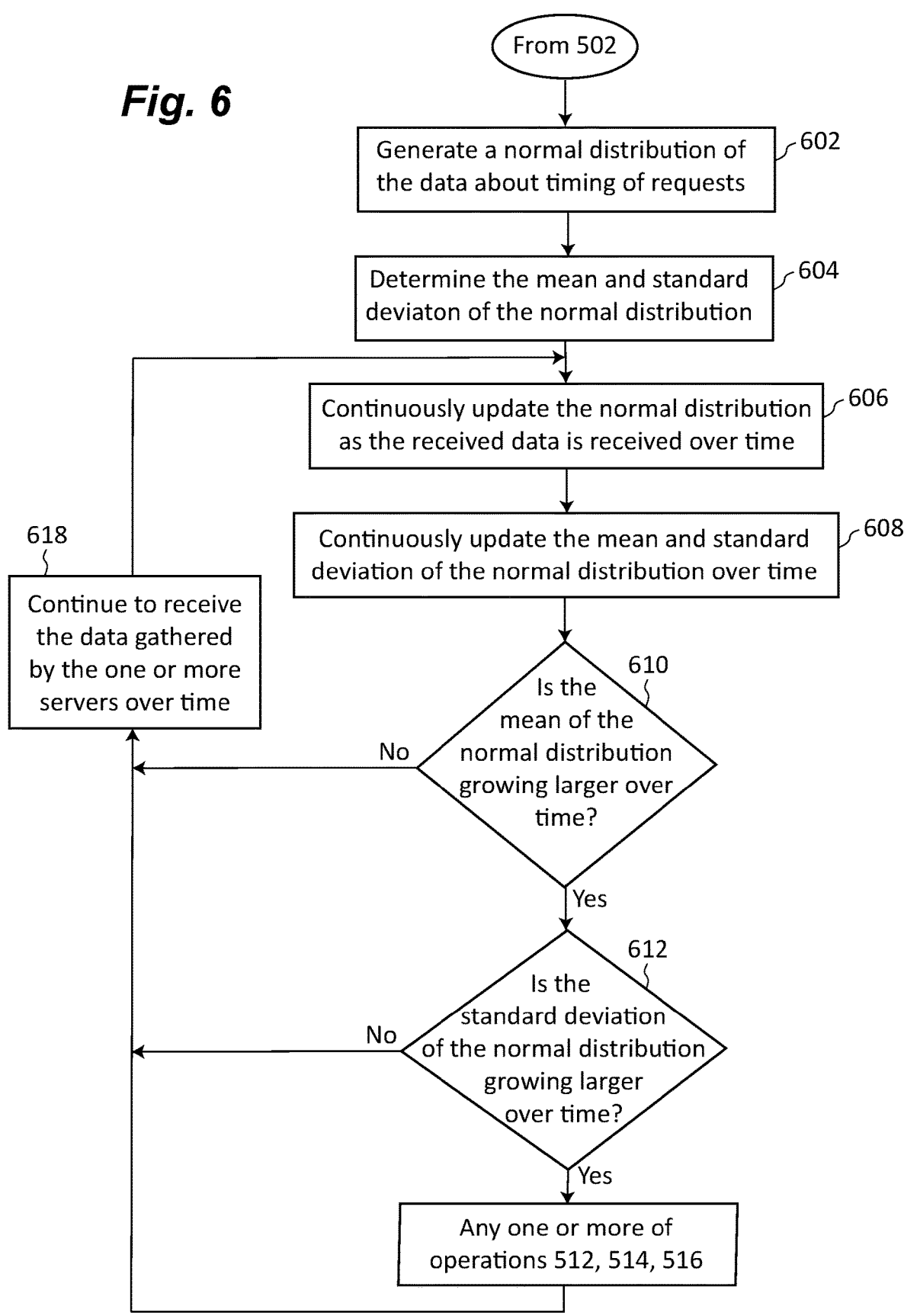
Figure 7:
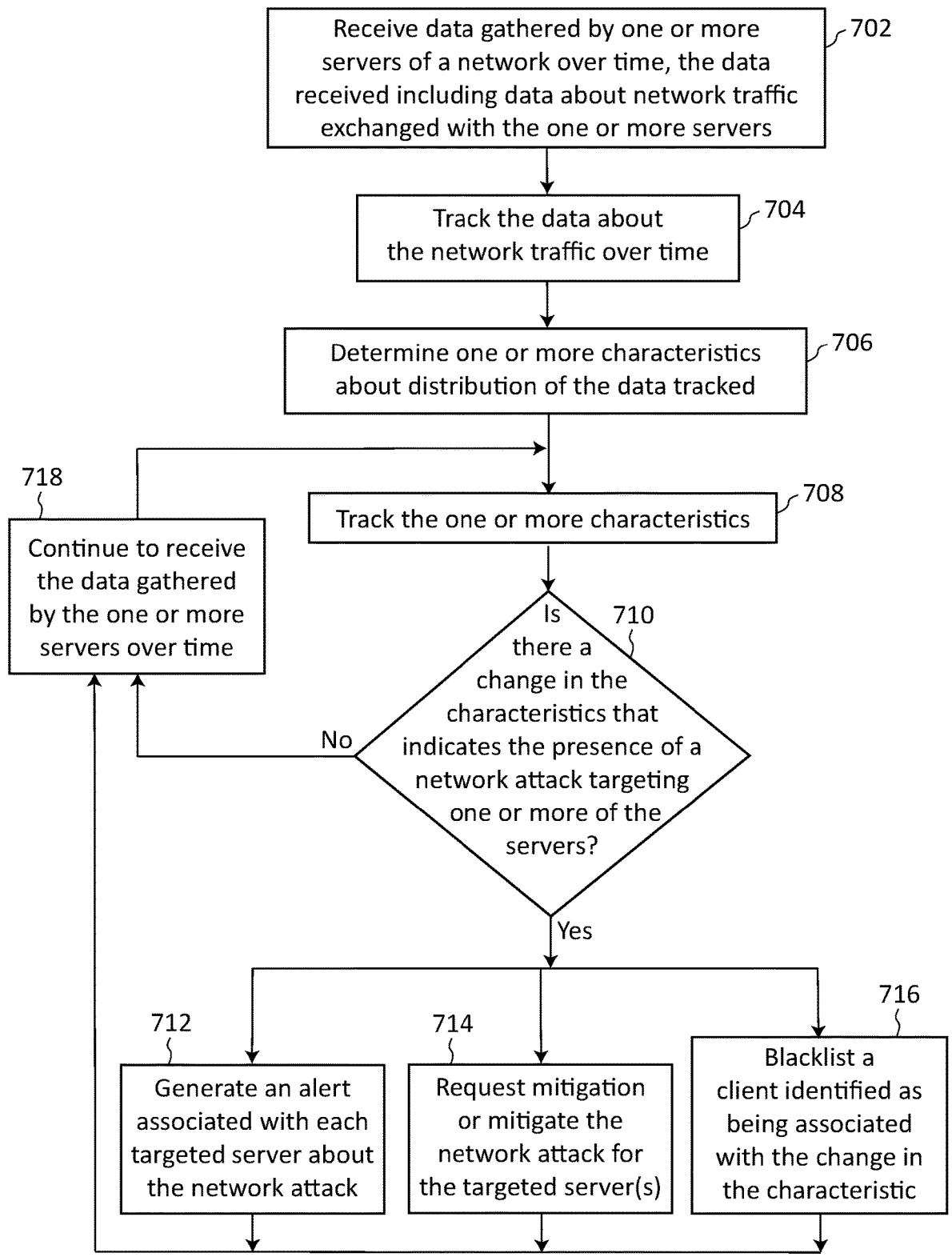

With reference now to FIGS. 5-7, shown are flowcharts demonstrating implementation of the various exemplary embodiments. It is noted that the order of operations shown in FIGS. 3 and 4 is not required, so in principle, the various operations may be performed out of the illustrated order or in parallel. Also certain operations may be skipped, different operations may be added or substituted, or selected operations or groups of operations may be performed in a separate application following the embodiments described herein.

FIGS. 5-7 illustrate operations of an example method performed by a network attack monitor, such as network attack monitor 104 shown in FIG. 1. With reference to FIG. 5, at operation 502, data gathered by the one or more servers over time is received. The data received can include data about timing of requests from a plurality of clients received by each of the servers. At operation 504, for each of the servers, the data about timing of requests over time is tracked. In embodiments, tracking of the data about timing of the requests can include identifying events in the received data that are requests to the server and determining for each request an amount of time since the beginning of the most recent request.

At operation 506, for each of the servers, one or more characteristics about distribution of the data tracked is determined. At operation 508, for each of the servers, the one or more characteristics is tracked. This tracking can indicate whether there is an increase in time for reading, by the server, a larger portion of requests tracked. At operation 510, for each of the servers, it is determined whether there is a change in the characteristics that indicates the presence of a network attack, such as a slowloris attack, targeting the server. If the determination at operation 510 is YES, indicating that there is such a change that is indicative of the presence of the network attack, then one or more of operations 512, 514, and 516 are performed, after which the method includes performing operation 518.

At operation 512, an alert about the network attack is generated in association with each server for which there is an indication that the server is targeted. At operation 514, either mitigation is requested or mitigation is performed for mitigating the network attack for the server(s) that are indicated as being targeted. At operation 516, each client identified as having submitted requests associated with a distribution for which the change in the characteristic was identified is blacklisted. At operation 518, the network attack monitor continues to receive the data gathered by the one or more servers over time, after which the method performs operation 508.

With reference to FIG. 6, in embodiments, the network attack monitor performs operations 602-612 in place of operations 504-510 shown in FIG. 5. In these embodiments, operation 602 is executed following execution of operation 502. At operation 602, a normal distribution is generated of the data about timing of requests. At operation 604, the mean and standard deviation of the normal distribution is determined. At operation 606, the normal distribution is continuously updated as the received data is received over time. At operation 608, the mean and standard deviation of the normal distribution is continuously updated over time. At operation 610, a determination is made whether the mean of the normal distribution is growing larger over time. If the determination at operation 610 is YES, meaning the mean of the normal distribution is growing larger over time, the method continues at operation 612. Else, if the determination at operation at 610 is NO, meaning the mean of the normal distribution is not growing larger over time, the method continues at operation 518 in which the data gathered by the one or more servers is continued to be received over time, after which the method continues at operation 606.

At operation 612, a determination is made whether the standard deviation of the normal distribution is growing larger over time. If the determination at operation is YES, meaning the standard deviation of the normal distribution is growing larger over time, the method continues with performance of any one or more of operations 512, 514, and 516, after which operation 518 is performed, after which the method continues at operation 606. Else, if the determination at operation 612 is NO, meaning the normal distribution is not growing larger over time, the method continues at operation 518, after which the method continues at operation 606.

FIG. 7 shows an example method performed, in embodiments, by the network attack monitor. At operation 702, data gathered by one or more servers of a network is received over time, wherein the data received includes data about network traffic exchanged with the one or more servers. At operation 704, the data about the network traffic is tracked over time. At operation 706, one or more characteristics about distribution of the data tracked is determined. At operation 708, the one or more characteristics is tracked. At operation 710, a determination is made whether a change in the characteristics indicates the presence of a network attack targeting one or more of the servers.

If the determination at operation 710 is YES, indicating that there is such a change that is indicative of the presence of a network attack, then one or more of operations 712, 714, and 716 are performed, after which the method includes performing operation 718.

At operation 712, an alert about the network attack is generated in association with each server for which there is an indication that the server is targeted. At operation 714, either mitigation is requested or mitigation is performed for mitigating the network attack for the server(s) that are indicated as being targeted. At operation 716, each client is blacklisted that was identified as being associated with causing the change in the characteristic. At operation 718, the network attack monitor continues to receive the data gathered by the one or more servers over time, after which the method performs operation 708.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments processing performed by the network attack monitor 104 shown in FIG. 1 may be implemented or executed by one or more computer systems. For example, processing performed by the network attack monitor 104 can be implemented using a computer system such as example computer system 802 illustrated in FIG. 8. In various embodiments, computer system 802 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 802 is only one example of a suitable system and is not intended to suggest any limitation as to the scope of use or functionality of embodiments of the disclosure described herein. Regardless, computer system 802 is capable of being implemented and/or performing any of the functionality set forth hereinabove.

Computer system 802 may be described in the general context of computer system-executable instructions, such as program modules, being executed by a computer system. Generally, program modules may include routines, programs, objects, components, logic, data structures, and so on that perform particular tasks or implement particular abstract data types. Computer system 802 may be practiced in distributed data processing environments where tasks are performed by remote processing devices that are linked through a communications network. In a distributed data processing environment, program modules may be located in both local and remote computer system storage media including memory storage devices.

Figure 8:
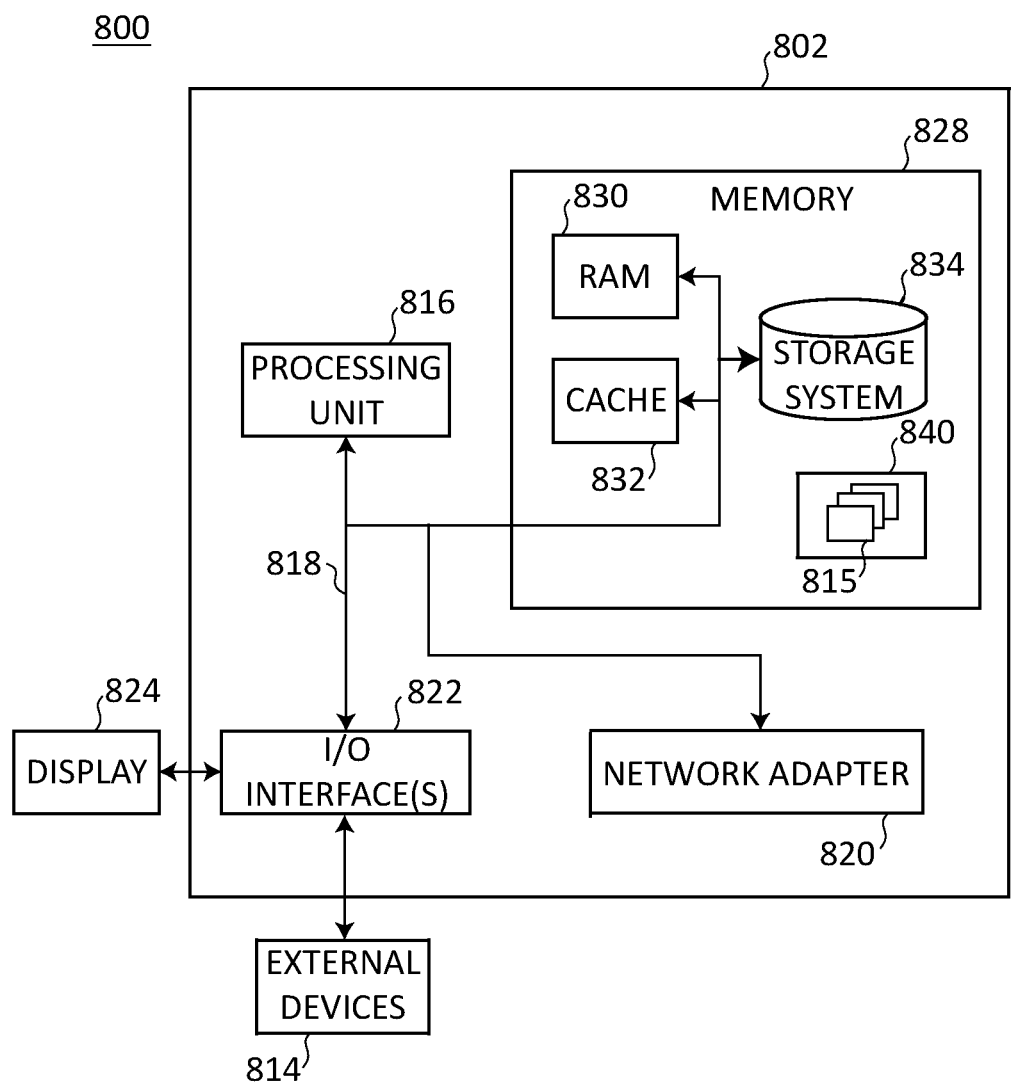
FIG. 8 illustrates a schematic block diagram of an example network computing device that implements the network attack monitor shown in FIG. 2, in accordance with an illustrative embodiment of the present disclosure.

Computer system 802 is shown in FIG. 8 in the form of a general-purpose computing device. The components of computer system 802 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 802 typically includes a variety of computer system readable media. Such media may be any available media that is accessible by the network attack monitor 104, and it includes both volatile and non-volatile media, removable and non-removable media.

System memory 828 can include computer system readable media in the form of volatile memory, such as random access memory (RAM) 830 and/or cache memory 832. Computer system 802 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the disclosure.

Program/utility 840, having a set (at least one) of program modules 815, such as the distribution module 202, the attack detection module 204, the alert module 206, the mitigation module 208, the blacklist module 210, and the user interface module 212 may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 815 generally carry out the functions and/or methodologies of embodiments of the disclosure as described herein.

Computer system 802 may also communicate with one or more external devices 814 such as a keyboard, a pointing device, a display 824, etc.; one or more devices that enable a user to interact with computer system 802; and/or any devices (e.g., network card, modem, etc.) that enable the network attack monitor 104 to communicate with one or more other computing devices. Such communication can occur via Input/Output (I/O) interfaces 822. Still yet, computer system 802 can communicate with one or more networks such as a local area network (LAN), a general wide area network (WAN), and/or a public network (e.g., the Internet) via network adapter 820. As depicted, network adapter 820 communicates with the other components of the network attack monitor 104 via bus 818. It should be understood that although not shown, other hardware and/or software components could be used in conjunction with computer system 502. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the disclosed method and system include the ability to detect, alert, and take countermeasures for network attacks, such as slowloris-type network attacks, against servers by leveraging statistics that is already generated by the servers. By using these statistics, there is no need to deploy intercept devices or perform deep packet inspection. Additionally, the method can be performed by using user programmable tools, such as a Python® plugin, including obtaining the statistics data from a statistics gathering module of the respective servers and analyzing the statistics data. The network attack monitor can operate locally, remotely, and/or with cloud-based support, such as for countermeasures, e.g., mitigation or blacklisting operations. The method can be included with a DDoS Open Threat Signaling (DOTS) implementation.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A computer-implemented method to detect a slowloris-type network attack, the method comprising:
receiving data gathered by a server of a network over time, the data received including data about time spent reading by the server in response to requests from a plurality of clients received by the server;
tracking the data about the time spent reading by the server over time;
determining one or more characteristics about distribution of the data tracked;
tracking the one or more characteristics to determine whether there is an increase in the time spent reading, by the server, a larger portion of requests tracked;
identifying a change in the characteristics that indicates the presence of a slowloris-type network attack; and
performing an action, in response to the change, to at least one of generate an alert about the slowloris-type network attack, request mitigation of the slowloris-type network attack, and mitigate the slowloris-type network attack.

2. The method of claim 1, wherein tracking the data about the time spent reading the requests includes:
identifying events in the received data that are requests to the server; and
determining for each request an amount of time since a beginning of a most recent request.

3. The method of claim 1, wherein determining the one or more characteristics about distribution of the data tracked includes:
generating a normal distribution of the data about the time spent reading the requests; and
determining a mean and standard deviation of the normal distribution.

4. The method of claim 3, wherein tracking the one or more characteristics includes:
continuously updating the normal distribution as the received data is received over time;
continuously updating the mean and standard deviation of the normal distribution over time;
identifying when the mean of the normal distribution grows larger over time; and
identifying when the standard deviation of the normal distribution grows smaller over time.

5. The method of claim 4, wherein identifying the change in the characteristics that indicates the presence of a slowloris-type network attack includes determining that both the mean of the normal distribution grows larger over time and the standard deviation of the normal distribution grows smaller over time.

6. The method of claim 1, wherein performing the action includes mitigating the slowloris-type network attack.

7. The method of claim 1, wherein receiving the data further includes receiving data from data sources included in the network that operate on data of the network independent of data inspection performance.

8. The method of claim 1, wherein tracking the data about the time spent reading the requests, determining the one or more characteristics about distribution, tracking the one or more characteristics, and identifying the change in the characteristics are performed per client submitting requests of the requests received by the server.

9. The method of claim 8, wherein performing the action includes blacklisting a client identified as having submitted requests associated with a distribution for which the change in the characteristic was identified.

10. The method of claim 1, wherein the network includes a plurality of servers, and the method further includes:
   receiving data gathered by the plurality of servers of the network over time, the data received including data about the time spent reading by the server in response to requests from a plurality of clients received by each of the servers;
   tracking, for each of the servers, the data about the time spent reading by the server over time;
   determining, for each of the servers, one or more characteristics about distribution of the data tracked;
   tracking, for each of the servers, the one or more characteristics to determine whether there is an increase in time spent reading, by the server, a larger portion of requests tracked;
   identifying, for each of the servers, a change in the characteristics that indicates the presence of a slowloris-type network attack targeting the server; and
   performing an action, in response to the change, to at least one of generate an alert associated with each targeted server about the slowloris-type network attack, request mitigation of the slowloris-type network attack for the targeted server, and mitigate the slowloris-type network attack for the targeted server.

11. A system to detect a slowloris-type network attack, the system comprising:
   a memory configured to store instructions;
   a processor disposed in communication with the memory, wherein the processor upon execution of the instructions is configured to:
      receive data gathered by a server of a network over time, the data received including data about time spent reading by the server in response to requests from a plurality of clients received by the server;
      track the data about the time spent reading by the server over time;
      determine one or more characteristics about distribution of the data tracked;
      track the one or more characteristics to determine whether there is an increase in time spent reading, by the server, a larger portion of requests tracked;
      identify a change in the characteristics that indicates the presence of a slowloris-type network attack; and
      performing an action, in response to the change, to at least one of generate an alert about the slowloris-type network attack, request mitigation of the slowloris-type network attack, and mitigate the slowloris-type network attack.

12. The system of claim 11, wherein determining the one or more characteristics about distribution of the data tracked includes:
   generating a normal distribution of the data about the time spent reading the requests; and
   determining a mean and standard deviation of the normal distribution.

13. The system of claim 12, wherein tracking the one or more characteristics includes:
   continuously updating the normal distribution as the received data is received over time;
   continuously updating the mean and standard deviation of the normal distribution over time;
   identifying when the mean of the normal distribution grows larger over time; and
   identifying when the standard deviation of the normal distribution grows smaller over time.

14. The system of claim 13, wherein identifying the change in the characteristics that indicates the presence of a slowloris-type network attack includes determining that both the mean of the normal distribution grows larger over time and the standard deviation of the normal distribution grows smaller over time.

15. The system of claim 11, wherein performing the action includes mitigating the slowloris-type network attack.

16. The system of claim 11, wherein receiving the data further includes receiving data from data sources included in the network that operate on data of the network independent of data inspection performance.

17. The system of claim 11, wherein tracking the data about the time spent reading the requests, determining the one or more characteristics about distribution, tracking the one or more characteristics, and identifying the change in the characteristics are performed per client submitting requests of the requests received by the server.

18. The system of claim 17, wherein performing the action includes blacklisting a client identified as having submitted requests associated with a distribution for which the change in the characteristic was identified.

19. The system of claim 11, wherein the network includes a plurality of servers, and the processor, upon execution of the instructions, is further configured to:
   receive data gathered by the plurality of servers of the network over time, the data received including data about the time spent reading by the server in response to requests from a plurality of clients received by each of the servers;
   track, for each of the servers, the data about the time spent reading by the server requests over time;
   determine, for each of the servers, one or more characteristics about distribution of the data tracked;
   track, for each of the servers, the one or more characteristics to determine whether there is an increase in time spent reading, by the server, a larger portion of requests tracked;
   identify, for each of the servers, a change in the characteristics that indicates the presence of a slowloris-type network attack targeting the server; and
   perform an action, in response to the change, to at least one of generate an alert associated with each targeted server about the slowloris-type network attack, request mitigation of the slowloris-type network attack for the targeted server, and mitigate the slowloris-type network attack for the targeted server.

20. A computer-implemented method to detect network attacks, the method comprising:
   receiving data gathered by one or more servers of a network over time, the data received including data about time spent reading by the one or more servers in response to requests in network traffic exchanged with the one or more servers;
   tracking the data about the time spent reading by the one or more servers over time;
   determining one or more characteristics about distribution of the data tracked;
   tracking the one or more characteristics;
   determining whether a change in the characteristics indicates a network attack; and performing an action to at least one of generate an alert about the network attack, request mitigation of the network attack, and mitigate the network attack.

* * * * *